United States Patent Office 2,966,523
Patented Dec. 27, 1960

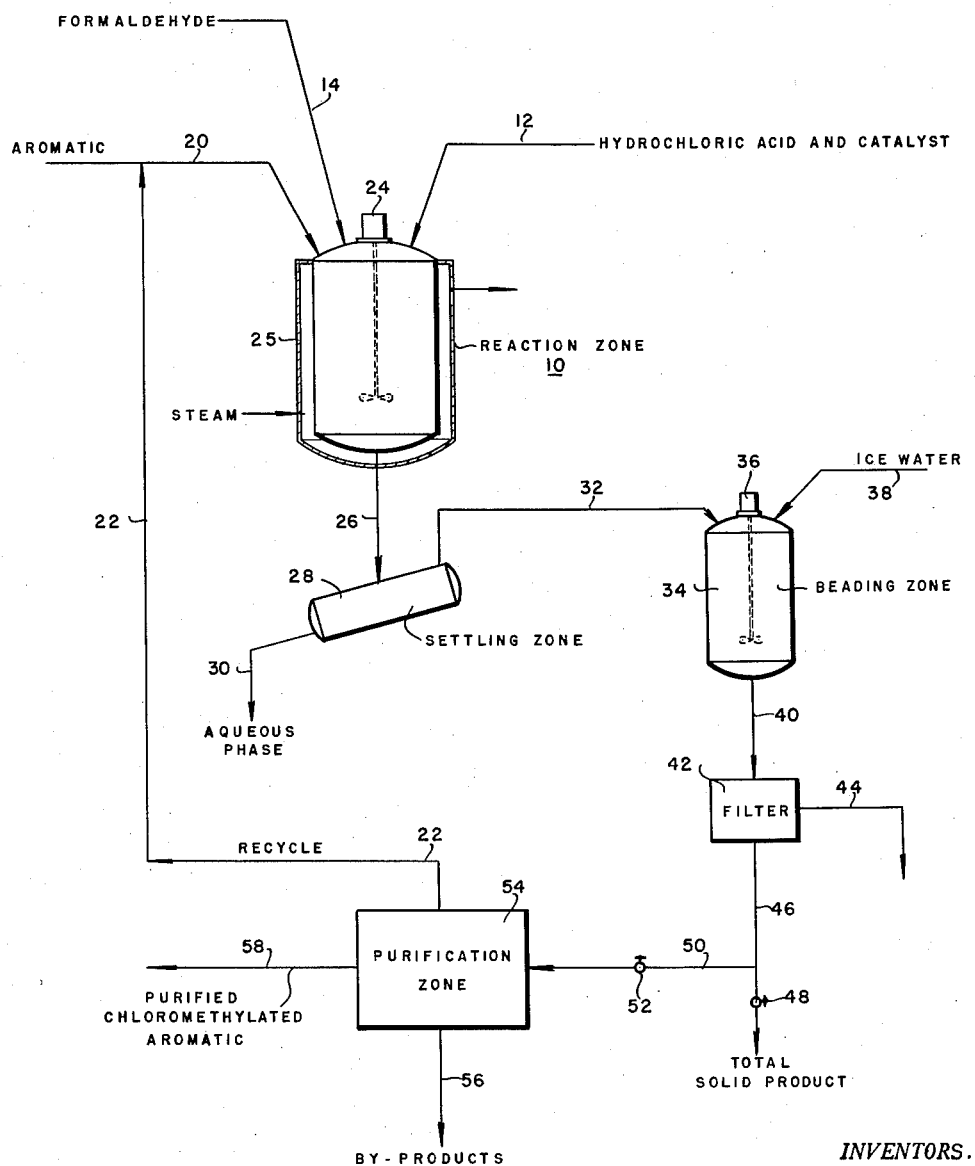

2,966,523

METHOD FOR RECOVERING SOLID CHLORO-METHYLATION PRODUCTS

William G. De Pierri, Jr., and Harold W. Earhart, Baytown, Tex., assignors, by mesne assignments, to Esso Research and Engineering Company, Elizabeth, N.J., a corporation of Delaware Filed July 14, 1959, Ser. No. 827,087

7 Claims. (Cl. 260—651)

This invention relates to a process for the recovery of solid chloromethylation products. More particularly, this invention relates to an improved method for easily and effectively recovering normally solid chloromethylated aromatics.

It is known that aromatic hydrocarbons may be converted into chloromethyl derivatives thereof by reaction with hydrochloric acid and formaldehyde. Suitable processes which may be utilized for this purpose are disclosed, for example, in copending De Pierri and Earhart application Serial No. 717,225, filed February 24, 1958, and now abandoned, and entitled "Chloromethylation Process," and in copending De Pierri and Earhart application Serial No. 826,994, filed of an even date herewith and entitled "Method for Chloromethylating Aromatic Hydrocarbons."

Briefly, the aromatic hydrocarbon may be reacted with from about 0.5 to about 6 mols of formaldehyde per mol of aromatic and from about 1 to 2 mols of hydrochloric acid per mol of formaldehyde. Acidic metal halide chloromethylation catalysts such as zinc chloride, stannic chloride, boron trichloride, antimony pentachloride, etc. may be employed within the range of about 0.2 to 2 mols of catalyst per mol of aromatic hydrocarbon. In addition, as disclosed in said copending application Serial No. 826,994, entitled "Method for Chloromethylating Aromatic Hydrocarbons," it is preferable to employ from about 1 to 10 mols of a water soluble salt of an alkali metal or an alkaline earth metal per mol of hydrogen chloride. Reaction temperatures may suitably be within the range of about 10° to about 150° C., reaction time may suitably be within the range of about 0.5 to about 5 hours and reaction pressures may suitably include atmospheric pressures or higher.

Many of the chloromethylation products that are formed by the chloromethylation reaction are comparatively high melting solids, such as solids melting within the range of about 60° to about 200° C. Examples of such solids are di(chloromethyl)durene, tri(chloromethyl)-mesitylene, di(chloromethyl)p-xylene, di(chloromethyl)-naphthalene, di(chloromethyl)isodurene, etc. Normally, the solid chloromethylation product is recovered at the end of the reaction only with difficulty. Thus, on cooling, the reaction mixture, the chloromethylation products tend to cool in the form of a hard solid mass containing substantial quantities of entrapped aqueous phase.

In accordance with the present invention, however, this problem is overcome through the provision of a process wherein the chloromethylation process, for the production of chloromethylated aromatic hydrocarbons having a melting point within the range of about 60° to about 200° C. is conducted at a temperature above the melting point of said product, and wherein at the end of the reaction the reaction mixture is shock-cooled in the presence of an added cooled diluent to a temperature below the melting point of the chloromethylated product within from about 0.5 to 5 minutes, such shock-cooling being accomplished while rapidly agitating the cooling reaction mixture. Preferably, the mixture is cooled to a temperature about 5° to 30° C. below the melting point thereof. The coolant may be defined as a non-reactive liquid such as water, brine, low-freezing point solvents such as toluene, xylenes, acetone, etc. and mixtures thereof which have a melting point below the melting point of the chloromethylation product (preferably at least about 30° C. lower). The amount of coolant to be used is not critical and will be largely determined by the difference in temperature between the temperatures of the charged chloromethylation product and coolant and by the final temperature that is desired.

Rapid agitation may be defined as agitation of an intensity sufficiency to maintain solid components in individual suspension in the liquid. Since the physical equipment in which the chilling step is conducted may vary widely in construction and size, precise numerical limitations have little meaning. In general, when agitation is employed, the energy supplied to the agitator may be within the range of about 0.01 to about 0.1 horsepower per gallon of reaction mixture.

The initially liquid chloromethylated aromatic hydrocarbon is converted to solid beads having a particle size within the range of about 0.05 to about 0.5 inch, when chilled by this method, such beads being comparatively free from occluded aqueous components of the reaction mixture.

The present invention will be further illustrated in connection with the accompanying drawing wherein the sole figure is a schematic flow sheet illustrating a preferred form of the present invention.

Turning now to the drawing, there is schematically shown a suitable reactor, such as a steam-jacketed reactor 10 to which aqueous solutions of hydrogen chloride and formaldehyde are added by way of lines 12 and 14, respectively. An acidic metal halide chloromethylation catalyst such as zinc chloride may be added, if desired, in solution in the hydrochloric acid by way of the hydrochloric acid charge line 12.

A suitable aromatic hydrocarbon such as durene from a source not shown is added by way of a line 20, together with recycle material (if any) added by way of a recycle line 22. The reactor 10 is preferably provided with suitable means of agitation such as an impeller 24 and suitable heating means such as a steam jacket 25.

It will be understood that the reaction conditions employed within the reactor 10 will be such that a solid chloromethylation product melting within the range of about 60° to 200° C. is formed and that the reaction temperature will be above the melting point of the chloromethylation product.

A discharge stream is withdrawn from the reactor 10 by way of insulated charge line 26 and treated in accordance with the present invention in order to obtain recovery of solid chloromethylation product. Thus, for example, the product stream 26 may be charged to a suitable insulated settling drum 28 wherein the stream is separated into an aqueous phase and a hydrocarbon phase comprising chloromethylated products, intermediates, unreacted feed and by-products. The aqueous phase, which may comprise water, formaldehyde, hydrogen chloride, catalyst, etc. is removed by way of line 30 for further treatment, as desired. Thus, the aqueous phase may be charged to a recovery zone (not shown) of any suitable construction wherein catalyst, hydrochloric acid, and formaldehyde may be recovered for recycle and wherein excess water may (e.g. water of reaction) be removed from the system. The hydrocarbon layer is withdrawn by way of an insulated line 32 leading to a beading zone of any desired construction which may comprise, for example, a kettle 34 provided with a suitable agitator 36. Within kettle 34, the charge stream 32 is mixed with a large excess (e.g., 2 to 20 volumes) of a coolant such as ice water charged by way of the line 38. As a consequence, the product is rapidly cooled with agitation (as above defined) whereby a suspension of beaded solid chloromethylation particles in an aqueous medium is formed. From the zone 34, the suspension is discharged by way of a line 40 to a suitable separating zone such as a filtration zone 42 wherein the beaded solid chloromethylation product is separated from the aqueous phase.

The solid beaded chloromethylation product is discharged from the zone 42 by way of a conduit 46 controlled by a valve 48 and, if desired, may be recovered as the final product.

However, the solid product will frequently contain chloromethyl aromatics other than the desired product and may contain some occluded aqueous phase whereby it may be desirable to purify the solid material. When such is the case, the recovered product is routed by way of a branch conduit 50 controlled by valve 52 leading from conduit 46 to a purification zone 54 wherein the solid material is processed. The zone 54 may comprise, for example, a solvating section (not shown) for dissolving the product and fractional crystallization facilities, fractional distillation facilities, or both (not shown) whereby the product may be separated, for example, into a by-products fraction 56 which is discarded from the system, a purified product fraction 58 which is recovered and the said recycle fraction 22.

The invention will be further illustrated in connection with the following specific examples which are given by way of illustration and not intended as limitations on the scope of this invention.

*Example I*

In a 12-1. Morton flask fitted with reflux condenser and stirrer were placed:

805 g. (6 mols) durene
818 g. (6 mols) anhydrous zinc chloride
2435 g. (30 mols $CH_2O$) 37% formalin
3944 g. (40 mols) 37% hydrochloric acid The mixture was agitated at the reflux temperature for 7 hours. At the end of this time, heating was stopped and stirring continued for 30 minutes. At this time, 3000 g. of ice and water were added to cool the solution. Vigorous stirring involving a horsepower input of 0.05 to 0.10 H.P./gallon was used during the addition. The product (beaded solid chloromethylation products of 0.05 to 0.5 inch particle size) was poured from the flask after an additional 10 minutes' stirring and was at a temperature of about 50° C. The beaded product was collected on a course sintered glass filter and washed with water. Other materials which will act in the same manner are the di- and tri-(chloromethyl) derivatives of mesitylene.

It is to be noted that if the cooling is not sufficiently rapid, the organic layer becomes tacky and agglomerates, which makes it very difficult to remove the product from the reactor.

*Example II*

A 12-liter Morton stirring flask was fitted with a reflux condenser, a Trubore stirrer and thermometer. Into the flask was placed the following materials:

4200 ml. (51.2 mols) concentrated hydrochloric acid
1080 g. (36.1 mols) of paraformaldehyde
818.2 g. (5.9 mols) of anhydrous zinc chloride
185.2 g. (3.2 mols) of sodium chloride The contents of the flask were heated to 80° C. with stirring and 721.1 g. (6.0 mols) of mesitylene were added. The reaction mixture was heated at the reflux temperature for 10 hours, at the end of which period reaction was stopped. The maximum temperature, 99° C., was attained at the end of about 5 hours, and was maintained for the remainder of the reaction period.

The product was separated into beads by following the procedure described above in connection with Example I.

The product was analyzed by the following procedure. A sample was reduced with lithium aluminum hydride in toluene solvent, and the reduced sample was analyzed by a low voltage mass spectrometer. The product was found to contain the following distribution of materials.

| Compound: | Mol percent |
|---|---|
| Mesitylene | 0 |
| Chloromethylmesitylene | 6 |
| Dichloromethylmesitylene | 41 |
| Trichloromethylmesitylene | 51 |
| Indanes | 2 |
| | 100 |

The product was recoverd by recrystallization from toluene. A total of 604 g. of trichloromethylmesitylene was recovered. This corresponds to a recovery of 76 percent of the trichloromethylmesitylene present in the product and to a yield of trichloromethylmesitylene of 38 percent of the theoretical amount.

What is claimed is:

1. In a process for the chloromethylation of an aromatic hydrocarbon wherein an aqueous phase and an oil phase are formed, said oil phase containing at least a normally solid chloromethylation product having a melting point within the range of about 60° to about 200° C., the improvement which comprises conducting said chloromethylation reaction at a temperature above the melting point of said solid chloromethylation product, separating said reaction mixture into a chloromethylation product oil phase and an aqueous phase, mixing said oil phase with rapid agitation with about 2 to 20 volumes of a diluent cooled to a temperature at least about 30° C. below the melting point of said oil phase, and thereafter recovering said solid chloromethylation product in beaded form from said cooled reaction mixture.

2. A method as in claim 1 wherein the cooling step is accomplished by mixing the chloromethylation product with cooled water with rapid agitation.

3. A method as in claim 2 wherein the chloromethylation product is a durene chloromethylation product.

4. A method as in claim 2 wherein the chloromethyltion product is a mesitylene chloromethylation product.

5. In a chloromethylation process wherein a methyl benzene is reacted with formaldehyde and hydrochloric acid in the presence of water in a reaction zone to form a reaction mixture containing a polychloromethylated methyl benzene having a melting point of about 60° to about 200° C., the improvement which comprises conducting said chloromethylation reaction at a temperature above the melting point of said polychloromethylation product, withdrawing at least a portion of said reaction mixture from said reaction zone and separating said reaction mixture into an aqueous phase and an oil phase containing said polychloromethylation product, mixing said oil phase with rapid agitation with about 2 to 20 volumes of water cooled to a temperature at least 30° C. below the melting point of said polychloromethylation product to form said polychloromethylation product into a beaded product and thereafter recovering said beaded solid.

6. A method as in claim 5 wherein the methyl benzene is durene and the polychloromethylation product is bis(chloromethyl)durene.

7. A method as in claim 5 wherein the methyl benzene is mesitylene and wherein the polychloromethylation product is tri(chloromethyl)mesitylene.

References Cited in the file of this patent

UNITED STATES PATENTS

| 2,862,980 | Muench et al. | Dec. 2, 1958 |
| 2,873,299 | Mikeska | Feb. 10, 1959 |